United States Patent [19]

Engeler

[11] Patent Number: 5,477,859
[45] Date of Patent: Dec. 26, 1995

[54] ULTRASOUND IMAGING SYSTEM HAVING SPATIAL FILTERING PREPROCESSOR

[75] Inventor: William E. Engeler, Scotia, N.Y.

[73] Assignee: General Electric Company, Schenectady, N.Y.

[21] Appl. No.: 387,519

[22] Filed: Feb. 13, 1995

[51] Int. Cl.$^6$ .......................................................... A61B 8/00
[52] U.S. Cl. ....................................... 128/661.01; 73/626
[58] Field of Search .......................... 128/660.07, 660.08, 128/661.01; 73/619, 620, 625, 626; 367/7, 138

[56] References Cited

U.S. PATENT DOCUMENTS

| | | | |
|---|---|---|---|
| 5,117,238 | 5/1992 | Silverstein et al. | 342/373 |
| 5,142,649 | 8/1992 | O'Donnell | 367/7 |
| 5,229,933 | 7/1993 | Larson | 364/413.25 |

OTHER PUBLICATIONS

Williams, "Fast Beamforming Algorithm", Journal of the Acoustical Society of America, vol. 44, pp. 1454–1455 (1968).

Primary Examiner—George Manuel
Attorney, Agent, or Firm—Marvin Snyder

[57] ABSTRACT

An ultrasonic imaging system beamforming architecture comprises a fixed wideband preprocessor section followed by a reduced number of dynamically adjusted delay channels. The preprocessor includes a transform beamformer with spatial filtering followed by a delay beamformer. Each transform preprocessor provides transformation of the local array space data into beam space. One, or combinations, of these beams may then be selected as input signals to an inverse transform which converts the beam space data back into array space data. This re-establishes the spatial array, but with a reduced directional view, allowing an inverse transform of reduced size to be used for the reconstruction. The result is a decrease in the number of channels required by the remainder of the beamformer. If the beam direction specified in the preprocessor sections is different from that specified in the channel delay processor, a resulting error that causes spurious beams to be formed in unwanted directions is mitigated by forming a spatial filter in each preprocessor section using adjacent channel information.

19 Claims, 17 Drawing Sheets

10

ULTRASOUND IMAGING SYSTEM HAVING SPATIAL FILTERING PREPROCESSOR

FIELD OF THE INVENTION

This invention relates to vibratory energy imaging systems and, more particularly, to an ultrasound imaging systems in which the number of transducer elements is greater than the number of beamforming channels.

BACKGROUND OF THE INVENTION

A conventional ultrasound imaging system, such as is used in medical imaging, for example, comprises an array of ultrasonic transducer elements which transmit an ultrasound beam and then receive the reflected beam from the object being studied. For ultrasound imaging, the array typically comprises a multiplicity of transducer elements arranged in a line and driven with separate respective voltages. By selecting the time delay (or phase) and amplitude of the applied voltages, the individual transducer elements can be controlled to produce ultrasonic waves which combine to form a net ultrasonic wave that travels along a preferred vector direction and is focused at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when a transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting a separate time delay (and/or phase shift) and gain to the signal from each respective receiving transducer element.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along an acoustic beam or scan line. The receiver is dynamically focused at a succession of ranges along the scan line as the reflected ultrasonic waves are received.

Ultrasonic imaging systems are known in which each transducer element is served by a respective individual analog channel followed by a respective analog-to-digital (or A/D) converter and one respective delay chip. Thus, a 128-channel system requires 128 delay chips and all of their associated memory and bus components.

In some ultrasound imaging systems, the number of transducer elements is greater than the number of time delay channels. For example, a system having a 256-segment transducer and a 128-channel beamformer is known. That system requires multiple firings and multiplexing of the transducer signals to provide this expanded function. Repeated firings, however, limit applicability of this technique to relatively modest increases.

With 1.5-dimensional and two-dimensional arrays planned for the future, systems utilizing a large number of effective channels will be required. This must be achieved without a concomitant increase in power and complexity. An architectural concept that can provide these results without resorting to multiple firings is required.

SUMMARY OF THE INVENTION

Narrow-band, frequency domain beamforming has long been used for such near-monochromatic ultrasonic systems as sonar detection systems. In such systems, the entire process may be performed by a discrete Fourier transform (DFT) of the array data. In the case of medical ultrasound, however, the long delays required for imaging, as well as the short focal lengths and short pulse lengths, relative to the array size, preclude its general use. If, on the other hand, the transform is restricted to signals from nearly adjacent transducer elements only, these limitations do not apply.

The present invention is an improved ultrasonic imaging system which utilizes a two-stage beamforming architecture comprised of a fixed wideband preprocessor section followed by a reduced number of dynamically adjusted delay chips. In accordance with the preferred embodiments, the preprocessor comprises a transform beamformer with spatial filtering, followed by a delay beamformer. A further aspect of the invention involves the use of oversampled delta-sigma (or Δ-Σ) modulators to provide A/D conversion for the system.

The system in accordance with the invention employs sets of local transforms, each set serving a relatively few channels. Each transform preprocessor provides a transformation of the local array space data into beam space. One or combinations of these beams may then be selected for an inverse transform by which the beam space data are converted back into array space data. This re-establishes the spatial array, but with a reduced directional view. Because these data are restricted in direction, an inverse transform of reduced size may be used for the reconstruction. This is equivalent to a filtering and decimation process. The result is a decrease in the number of channels required by the remainder of the beamformer.

Signals carried by the reduced number of channels are processed just as in a conventional digital baseband imaging system with one delay chip per channel. The final delay processor provides the wide-bandwidth delay necessary to combine the set of individual transforms into one total beam and also provides all of the associated beamforming features such as dynamic focusing and apodization.

The reduction in channels achieved by the preprocessor depends on the ratio of the order of the input transform to the order of the output inverse transform. In the limit, where just a single beam direction undergoes the inverse transform, the beam selection and inverse transform require just a single conductor. In such system only one beam direction needs to be calculated, as only one is used. The reduction factor then becomes the size of the input transform M.

If the beam direction specified in the preprocessor sections is different from that specified in the channel delay processors, an error results. This could be caused by changes in the dynamic focus of the channels without a concomitant change in the preprocessors. The error causes spurious beams to be formed in unwanted directions. In accordance with a further aspect of the present invention, this problem is greatly reduced by forming a spatial filter in each of the preprocessor sections, using adjacent channel information.

DETAILED DESCRIPTION OF THE PREFERRED EMBODIMENTS

Figure 1:
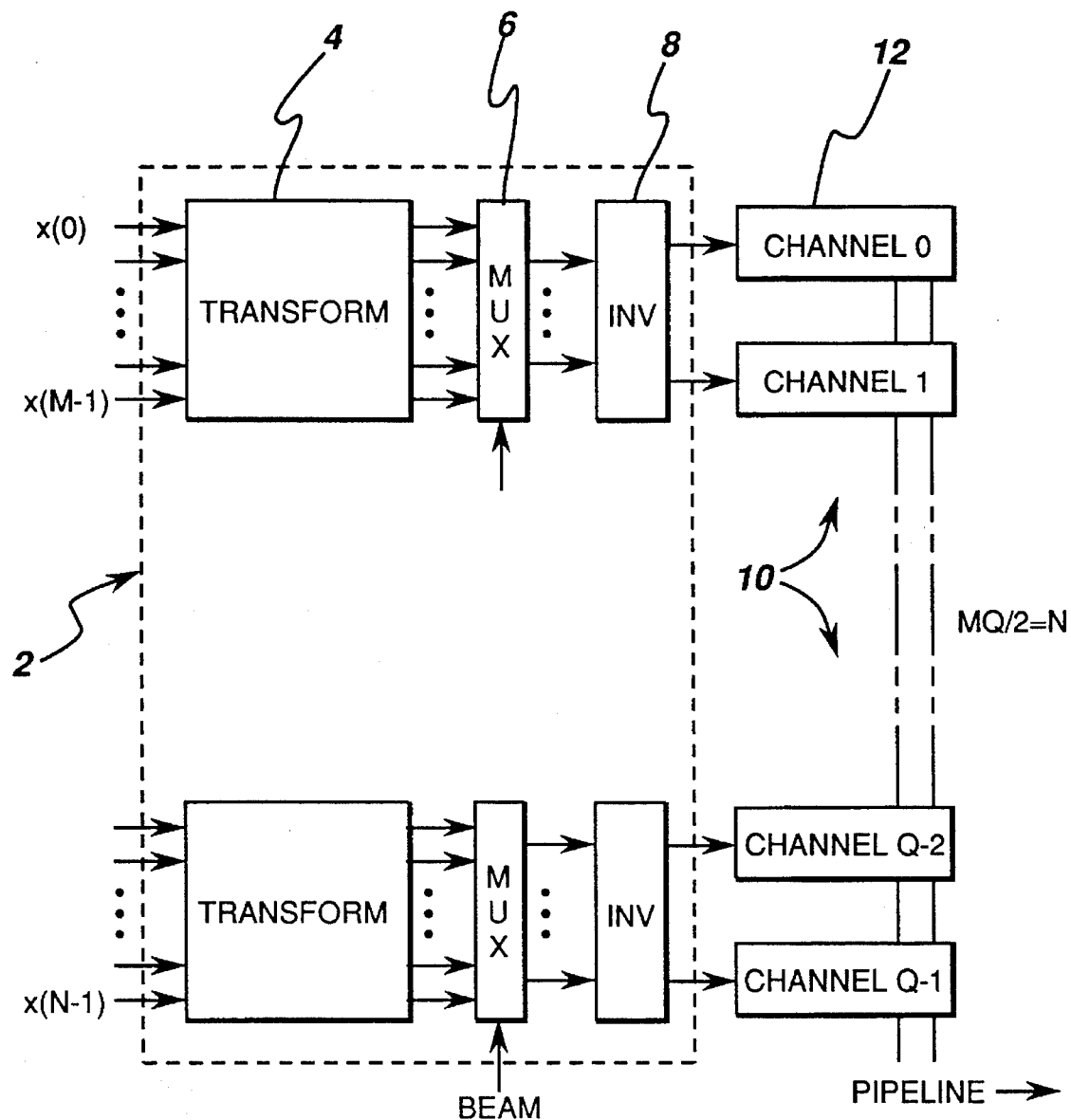
FIG. 1 is a block diagram of a transform preprocessor architecture in accordance with the concept of the invention.

FIG. 1 illustrates a preprocessor section 2 employed in an ultrasound imaging system to reduce the channel count of the system. In this system, the input signals from an N element transducer array are provided in groups of M signals each, and are applied to the inputs of individual transform preprocessor sections 4 which form beams in the desired directions. Signals representing beam directions selected by multiplexers 6 are inverted by inverse transform processors 8 to generate a reduced set of spatial preprocessor outputs. The number Q of channels 12 required in a delay processor 10 is therefore reduced by the ratio of M to the number of outputs of preprocessor 2. In this system, N=MQ/2.

The amount of reduction achieved by preprocessor 2 depends on the ratio of the order of the input transform to that of the output inverse transform. In the limit, where just a single beam direction is sent to the inverse transform, the beam selection and inverse transform become just a single conductor. In such system only one beam direction needs to be calculated during each firing of the transducer, as only one direction is used. The reduction factor then becomes the size of the input transform M.

The resulting reduced channels of data are processed just as in a conventional ultrasound imaging system. Final delay processor 10 provides the wide bandwidth delay necessary to join the set of individual transforms into one total beam. If the phase shifts specified by the transform are provided as real (i.e., time) delays, not simply phase delays, the full wide bandwidth nature of the system is maintained.

Figure 2:
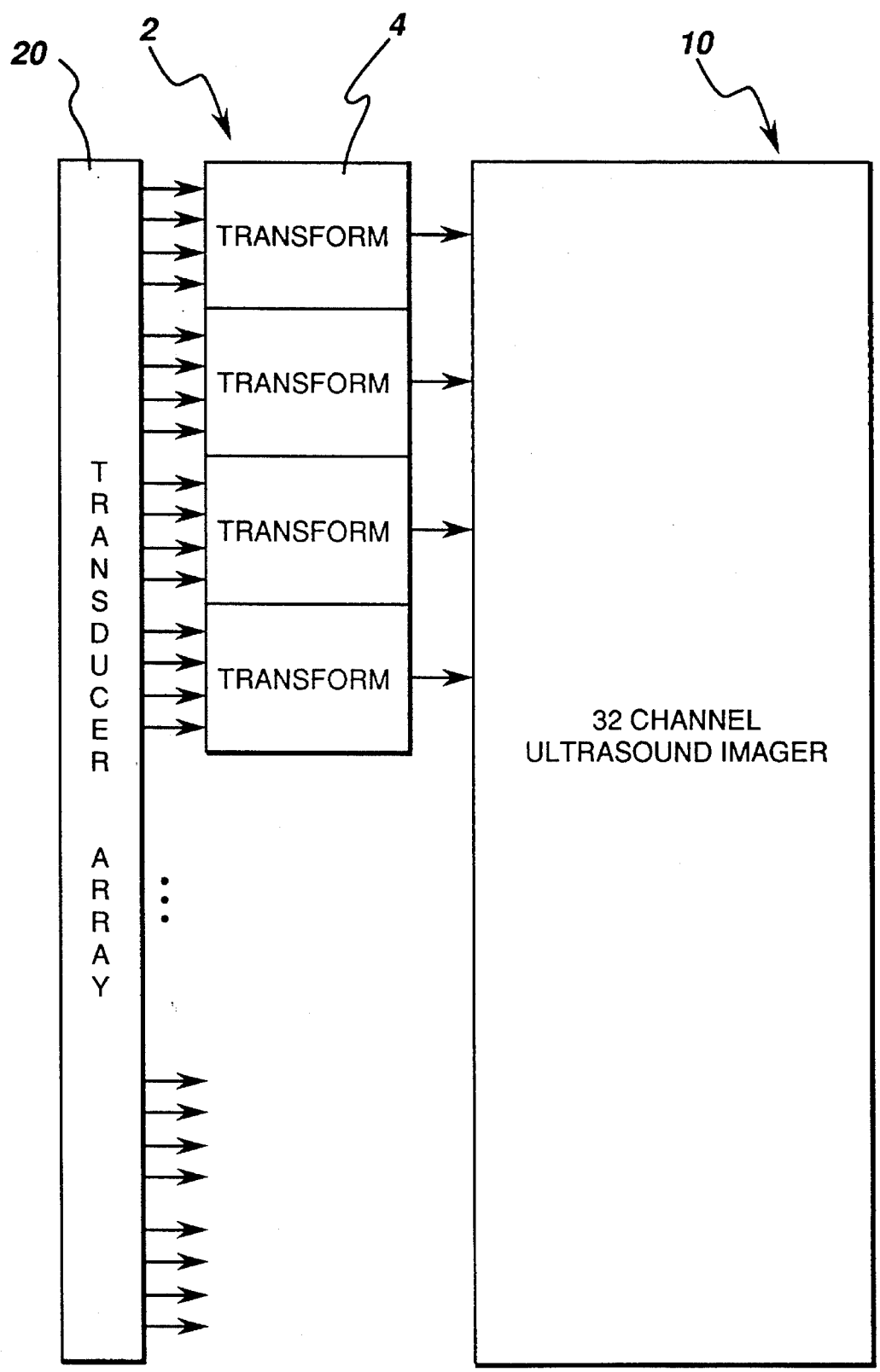
FIG. 2 is a block diagram of a transform preprocessor architecture in accordance with a preferred embodiment of the invention.

FIG. 2 shows an imager of this type wherein each transform preprocessor section 4 has four inputs fulfilled from a transducer array 20, and one output, i.e., M=4. A single conductor connects each respective four-input preprocessor section 4 to a delay beamformer 11. Therefore, an imaging system of this configuration having 128 transducer elements requires only 32 delay channels. This structure, however, is sensitive to a mismatch between the beam direction specified in the preprocessor section and that specified in the channel delay section. When such mismatch occurs, additional unwanted beams are formed at angles of 45° to the desired direction. This becomes a particularly troublesome problem when dynamic focus modifications alter the direction of the channel delay beam during beam observation time.

Figure 3:
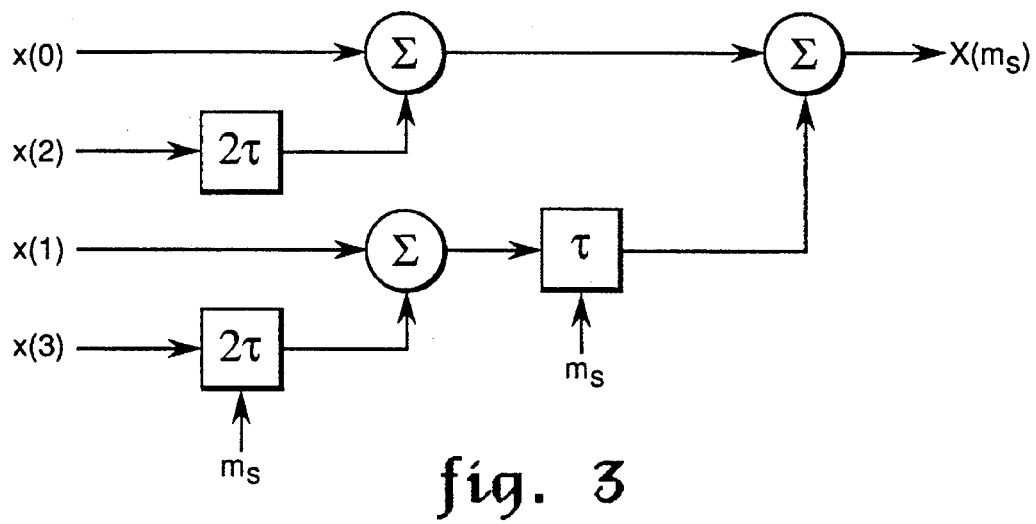
FIG. 3 is a block diagram of a transform preprocessor structure having four inputs and a single beam direction output (i.e., M=4) in accordance with one preferred embodiment of the invention.

FIG. 3 illustrates an M=4 transform preprocessor structure that generates a single beam direction. Each time delay $\tau$ represents a 0 or ±90° phase shift, depending on the desired value of an index $m_s$. This structure generates a desired output signal $X(m_s)$, where $m_s$ is −1, 0, 1 or 2 and X represents the transform output signal of that index. The structure, however, is not limited to $m_s$ being an integer value if intermediate values of delay are provided.

Figure 4:
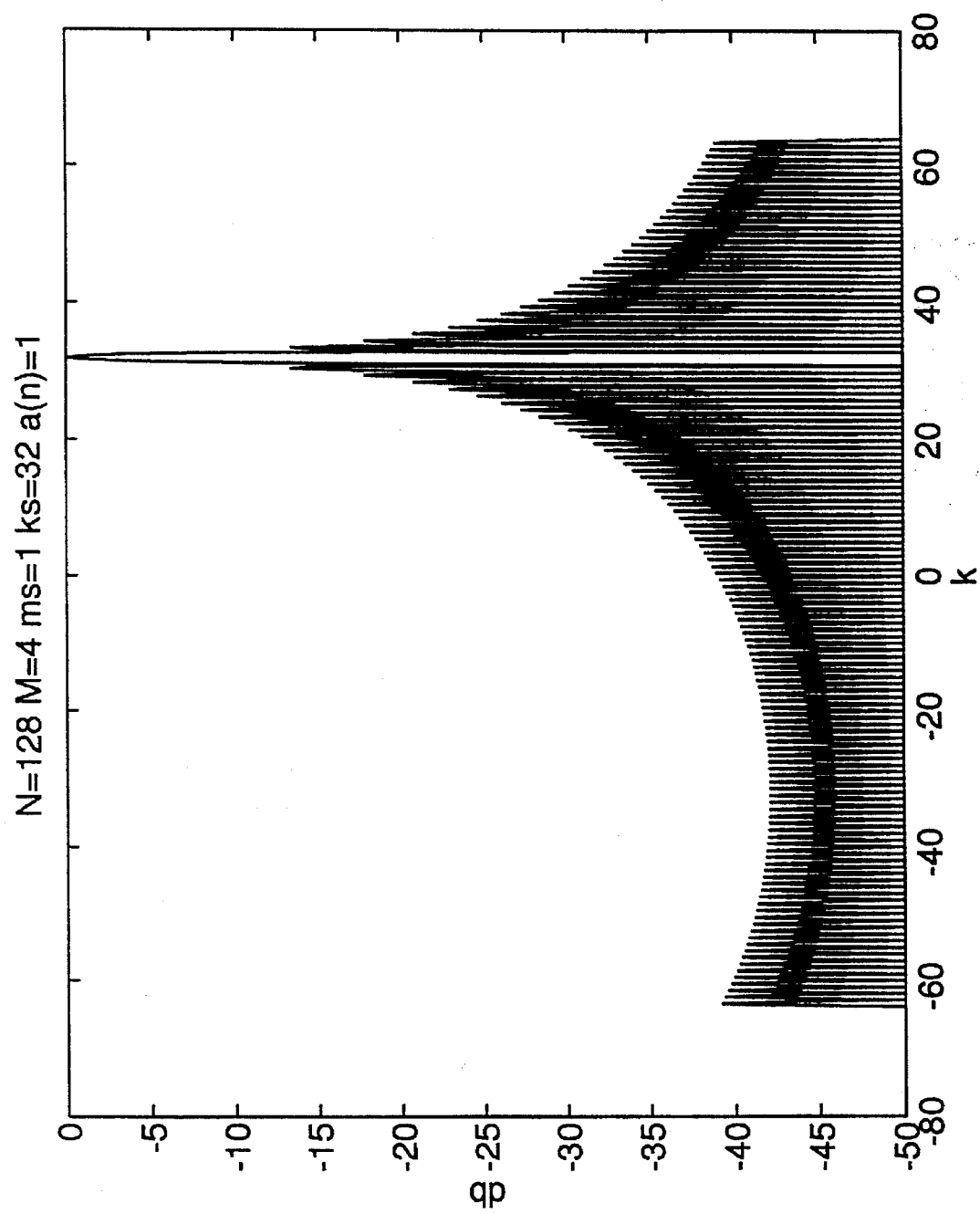
FIGS. 4 through 6 are graphs showing the beam profile for a simulated system having the M = 4 preprocessor architecture of FIG. 3 when the beam steering error offset between the transform preprocessor and channel delay processor index equals 0, 2 and 16 (15°), respectively.

Computer simulations of various architectures were generated. A vector array of far-field sinusoidal signals representing input signals to an array of 128 elements was processed through a sequence of filters and finally summed to simulate the action of various array architectures. FIG. 4 shows the one-way beam profile resulting from this analysis. The preprocessor beam direction was specified by setting $m_s=1$. This corresponds to a beam making an angle of 30° to the array normal. The same angle was specified in the final delay processor by setting $k_s=32$, where $k_s$ represents the beam direction index of that processor. In general, for a linear array the index k and the beam angle are related by:

$$k = \frac{Nd\sin\theta}{\lambda} \qquad (1)$$

where N is the number of elements in the array; d is the spacing of these elements; θ is the angle which the beam direction makes with the array normal; and λ is the wavelength of sound in the medium. For the customary array spacing of λ/2, k may take on values from −N/2 to +N/2, corresponding to steering angles between −90° and +90°, respectively. The central beam profile, located at k=32 in FIG. 4, has a beam width corresponding to an array of 128 elements. The sidelobe levels observed are those expected for an array formed with a square window function a(n)=1, where a(n) represents the aperture weighting of the $n^{th}$ element of the array. In short, there was no degradation of the beamformer in spite of the fact that the final delay processor had only 32 channels.

Figure 5:
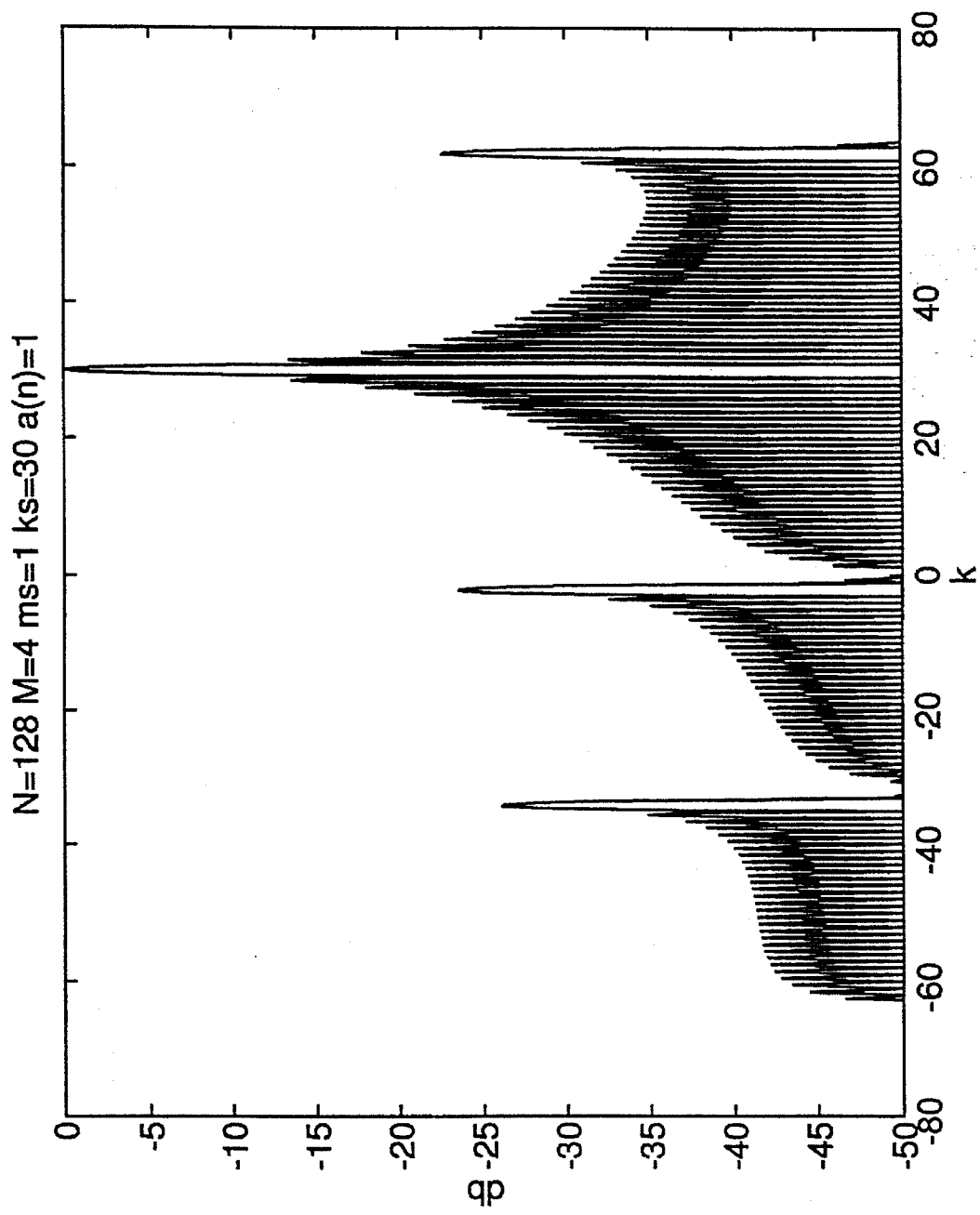

Additional simulations, however, showed that if any error exists between the steering angle specified in the preprocessor and that specified in the final delay processor, spurious signals result. If the beam is directed toward a slightly different direction in the final delay processor by setting $k_s$=30, a number of spurious signal directions are produced. These are spaced in directions approximately 30° from the desired $k_s$=30 beam. This is shown in FIG. 5. Even though the spurious signals are produced, the central beamwidth is not altered by the error and still reflects the full N=128 aperture.

Figure 6:
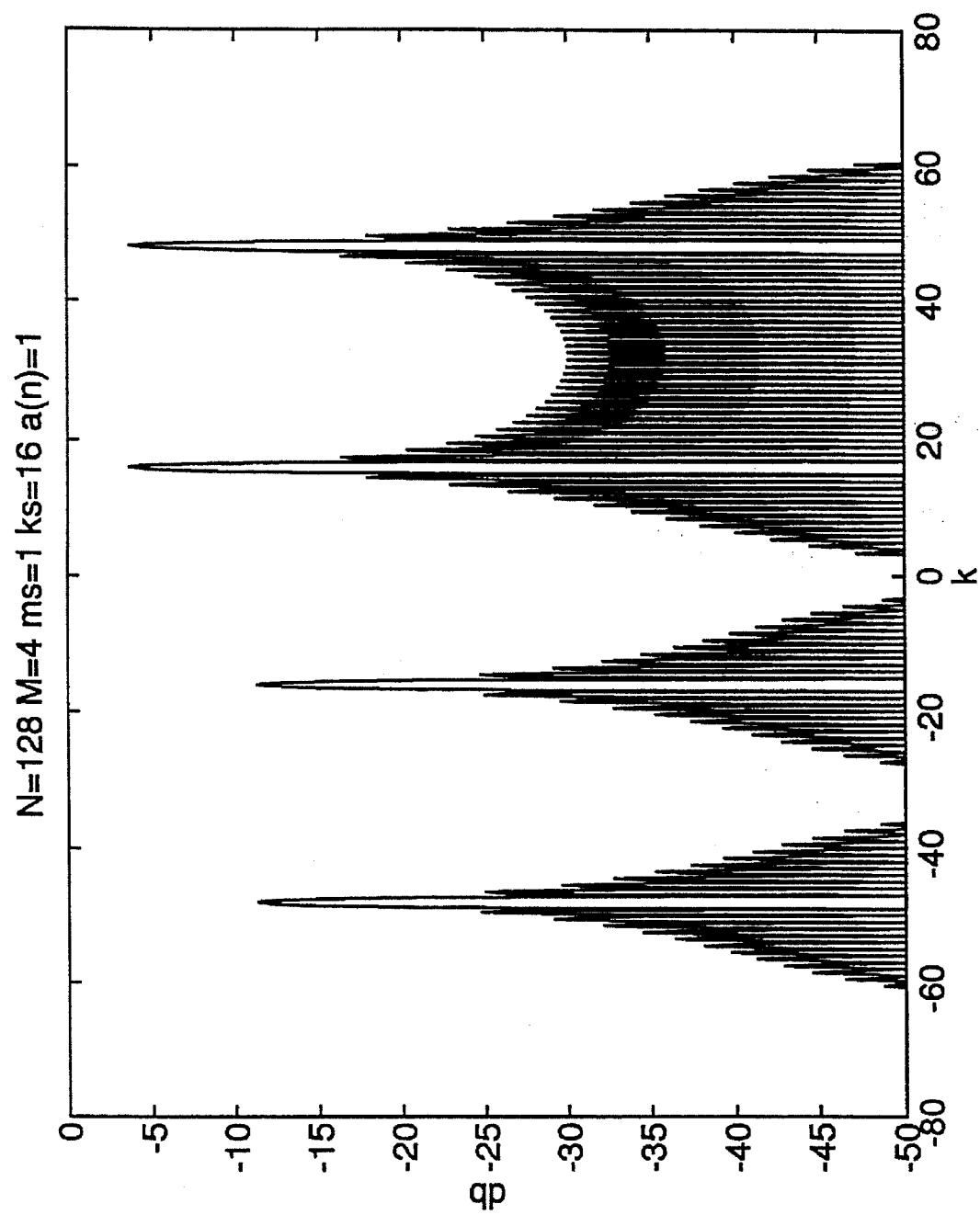

The spurious signals become larger as directional error increases. In the worst case, when the final delay processor was directed halfway between the $m_s$=0 and $m_s$=1 directions (namely, $k_s$=16), the central beam amplitude was degraded and the spurious signal increased to the point that it equaled the central beam in amplitude, as shown in FIG. 6. Even with this severe spurious signal, however, the beamwidth remains the same.

Figure 7:
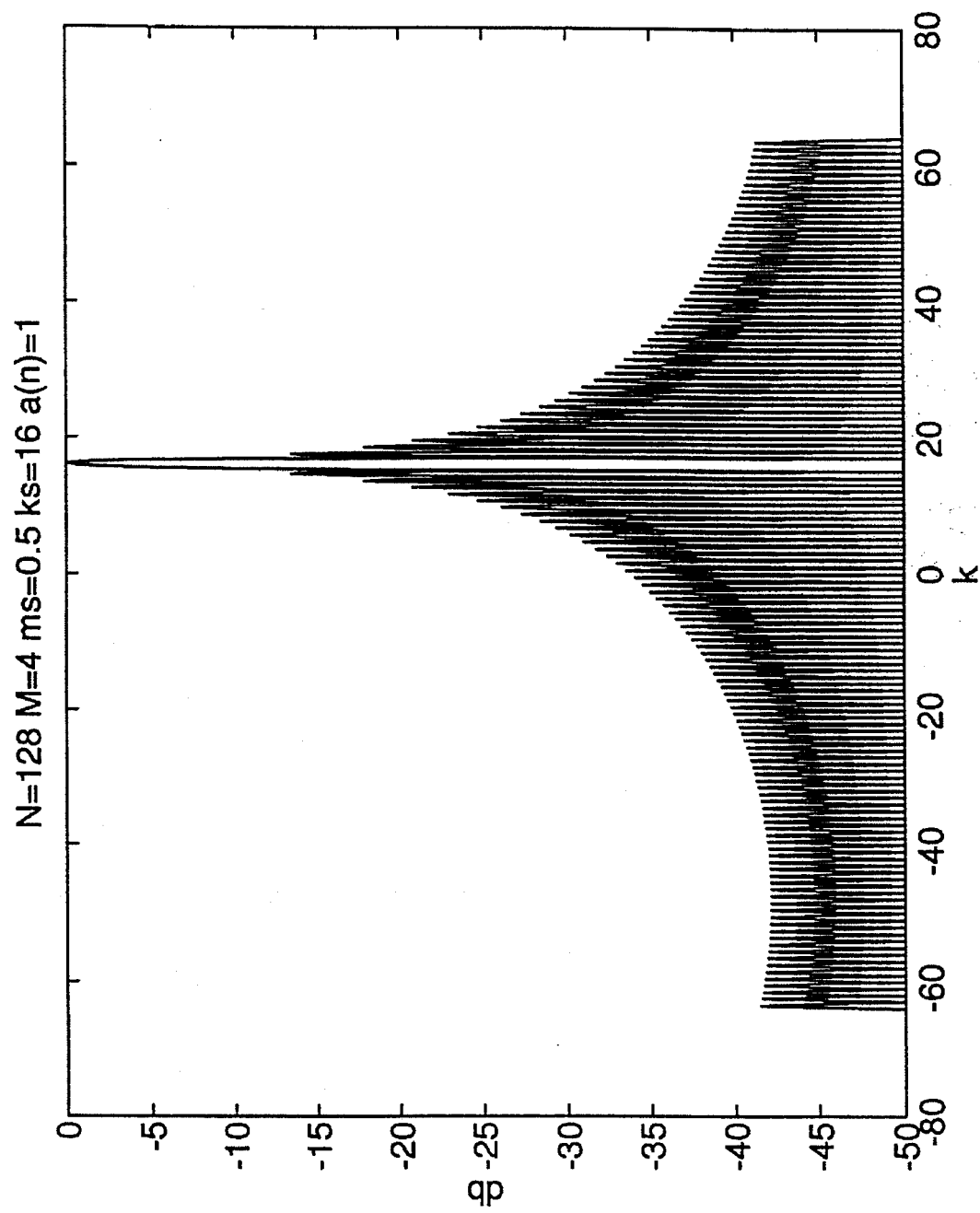
FIG. 7 is a graph showing the beam profile for a simulated system having the M=4 preprocessor architecture of FIG. 3 in the case when a beam steering error offset of 16 is corrected using a fractional value for the parameter ms, whereby the steering angle of the preprocessor is rotated to equal the steering angle of the channel delay processors.

If fractional values of $m_s$ are used rather than just the integer values $m_s$=0, 1, 2, 3, the error shown in FIG. 6 may be corrected, as shown in FIG. 7. In this case the value of $m_s$ was chosen to be 0.5. The preprocessor direction was set halfway between $m_s$=0 and $m_s$=1, thereby making the direction of the preprocessor equal to that of the final delay processor. As a result, no offset error exists and the spurious signals shown in FIG. 6 are eliminated. Setting $m_s$=30/32 and $k_s$=30 also generates no offset error and produces a beam without spurious signals in that direction.

In view of this result, quantization of the preprocessor must be in steps corresponding to the full array, not in steps corresponding to the preprocessor size. The preprocessor must therefore have N rather than M directions. With a preprocessor capable of N directions, the system of FIG. 2 can form the full set of beam directions. To accomplish this, the structure of FIG. 3 is used with τ set to the appropriate value as a function of the input parameter $m_s$.

Even though the beamformer and the preprocessor are set to the same direction at the start of the beam, with time this becomes no longer true. The direction of the final delay beamformer changes with time as the action of dynamic focusing comes into play. This causes a shift comparable to a change of 4 steps in the value of $k_s$. This offset error between the directions at which the preprocessor and the final delay processor are steered produces a spurious beam. The present invention constitutes a method and apparatus for correcting this offset error.

Figure 8:
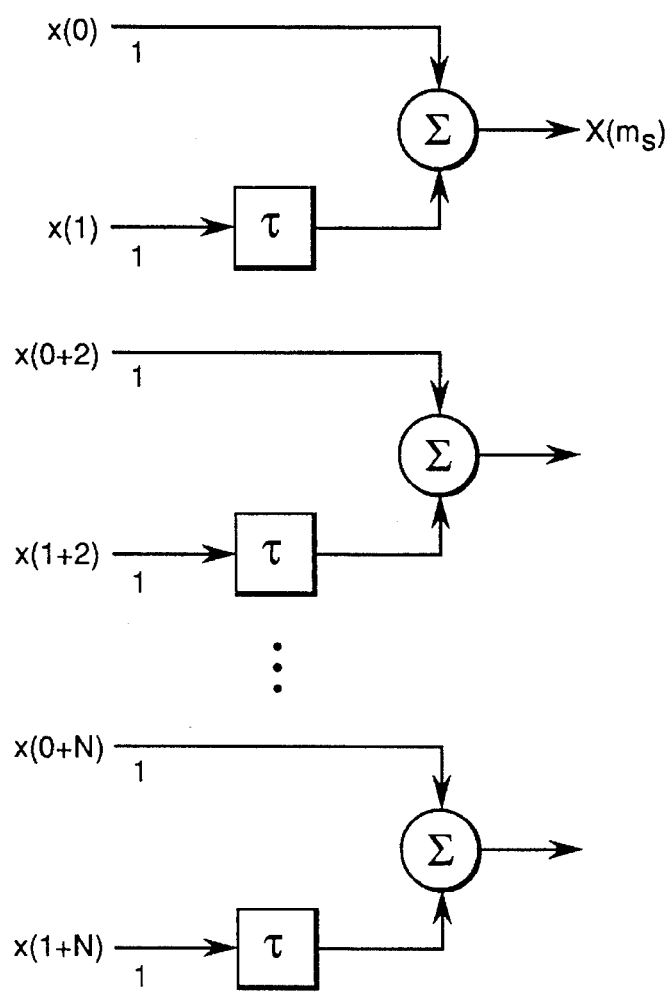
FIG. 8 is a block diagram of an unbalanced transform preprocessor wherein each section has two inputs and a single beam direction output (i.e., M=2).

FIG. 8 illustrates the transform structure of a single section of an M=2 preprocessor. A single transform X($m_s$) is produced in response to inputs x(0) and x(1) from a pair of adjacent transducer elements by summing x(0) and a time-delayed x(1), wherein the time delay duration is τ. This structure employs N+2 transducer elements and N/M+1 preprocessors.

In accordance with the broad concept of the present invention, the offset error caused by dynamic focusing in the delay processor can be corrected by supplying weighted portions of adjacent transducer element output signals into each preprocessor section. The remainder of the output signals from such adjacent transducer elements, i.e., the original output signal minus any weighted portions added to other preprocessor sections, are used in their respective preprocessor sections. In accordance with the present invention, the preprocessor structure forms a spatial filter which limits the sensitivity of the beamformer to beam steering errors between the preprocessor and the channel delay processors.

Figure 9:
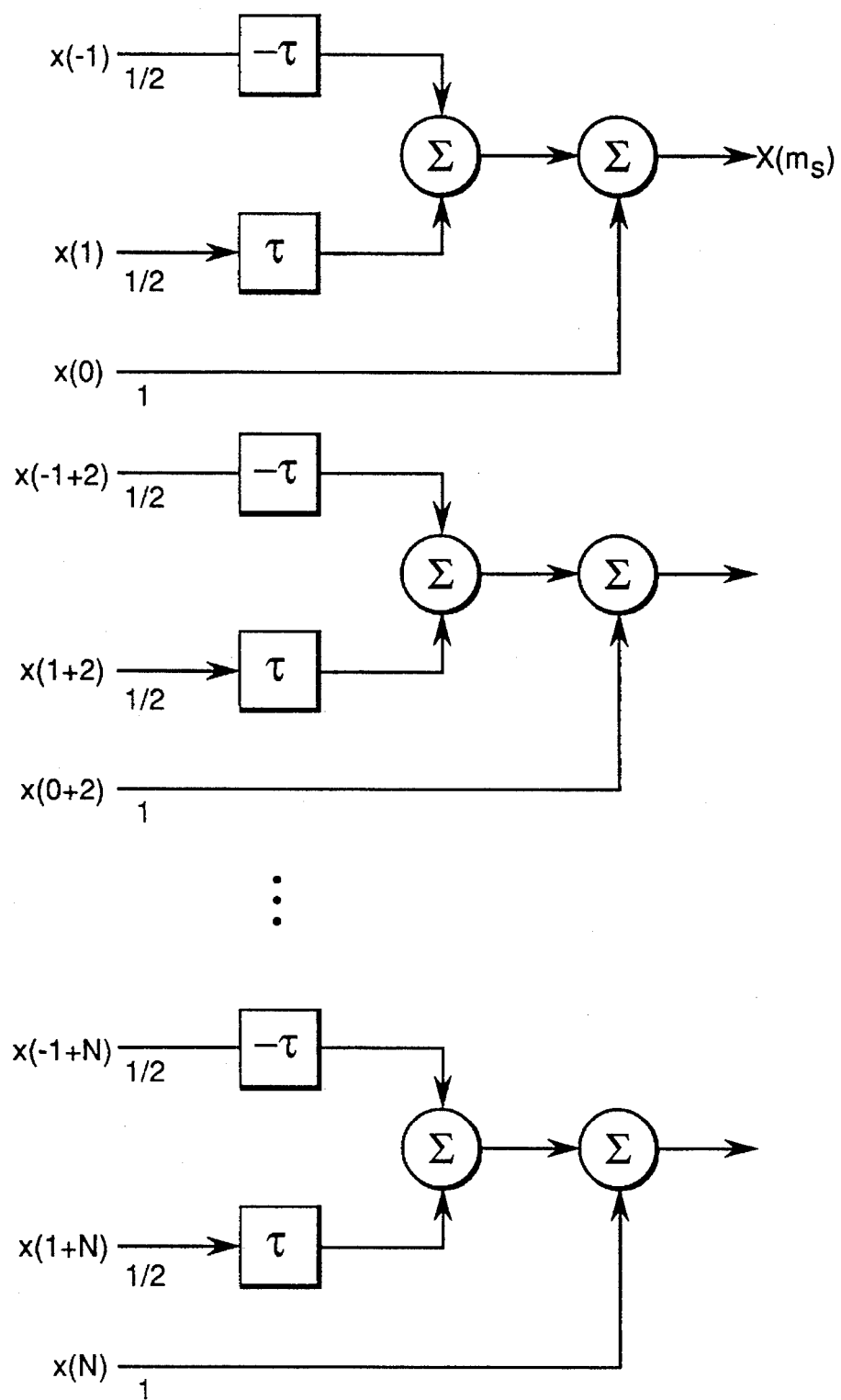
FIG. 9 is a block diagram of a balanced M=2 spatial filtering preprocessor which limits sensitivity of the beamformer to beam steering errors between the preprocessor and the channel delay processors in accordance with another preferred embodiment of the invention.

For example, the structure of the spatial filter for the case when M=2 is shown in FIG. 9, which shows one preprocessor section for receiving input signals from three adjacent transducer elements. The input signal received from the center element of the three-element set is designated x(0) and is effectively multiplied by a weighting factor of 1. The input signals x(−1) and x(1) received from the transducer elements on either side of the center element are each multiplied by a weighting factor of ½. These three terms ½x(−1), x(0) and ½x(1) are appropriately delayed as a function of ms and summed to form the output signal X($m_s$). Similarly, the output signal of the next preprocessor section will be the summation of the appropriately delayed terms ½x(1), x(2) and ½x(3) and so forth. All but the end input signals have a total weight of unity. Because of the end effects, there are N+transducer elements, N/2+1 preprocessors and N/2+1 output signals to the N/2+1 channel delay processors. In this and other block diagrams, τ is the delay difference between adjacent channels required to steer and focus the beam in the desired direction. Net negative delays are provided by offsetting all delays by a fixed value of sufficient size.

Figure 10:
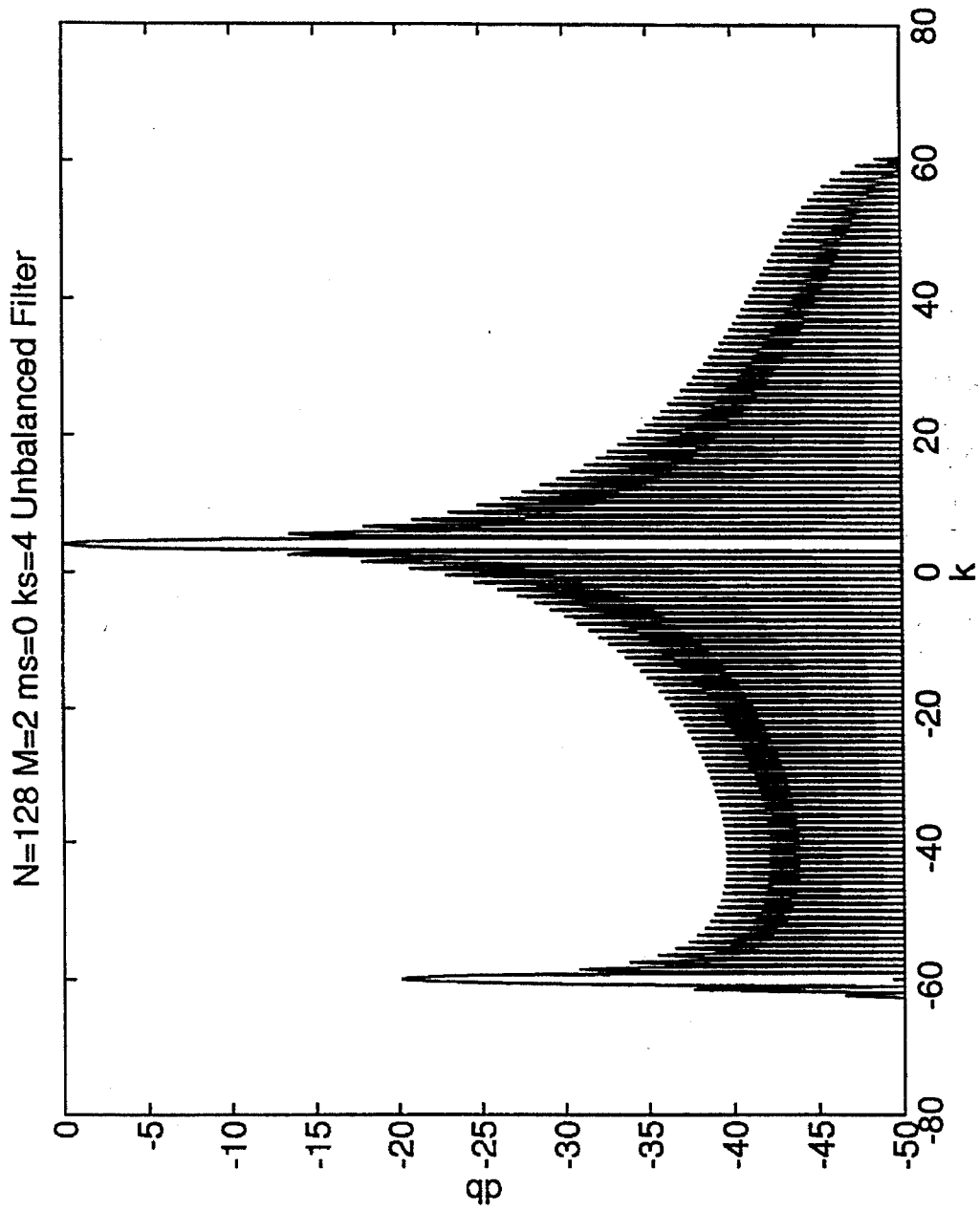
FIGS. 10 and 11 are graphs showing the beam profile for a simulated system having the M=2 preprocessor architecture of FIGS. 8 and 9, respectively, when the beam steering error offset between the transform preprocessor and channel delay processor index equals 4.
Figure 11:
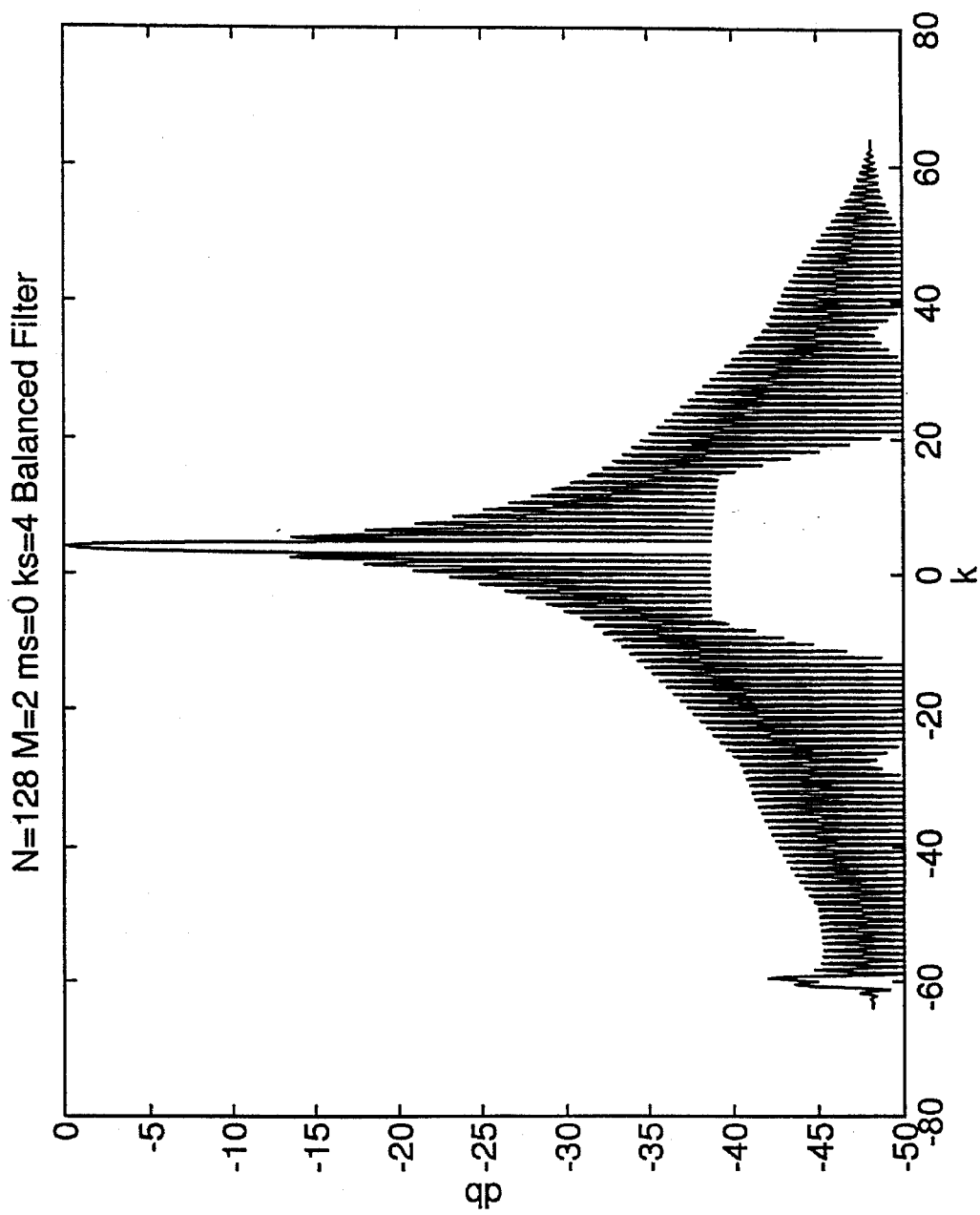

The balanced spatial filter structure shown in FIG. 9 has the effect of reducing the spurious beam resulting from steering angle offset error because it is much less sensitive to small offset errors than is the unbalanced structure shown in FIG. 8. This may be seen by comparing the beam profiles of FIGS. 10 and 11. In both cases the offset difference is 4. This is the amount of offset resulting from dynamic focusing produced by the delay processors. In FIG. 10, dynamic focusing in conjunction with an unbalanced preprocessor structure generates a spurious beam that is 20 dB below the main beam. When the balanced structure is used, the same spurious signal is more than 42 dB lower, as seen in FIG. 11. It is apparent, therefore, that balanced filters provide significant improvement in systems of this type. The M=2 filter structure forms the basic pattern used in the higher-order error-insensitive filters.

Figure 12:
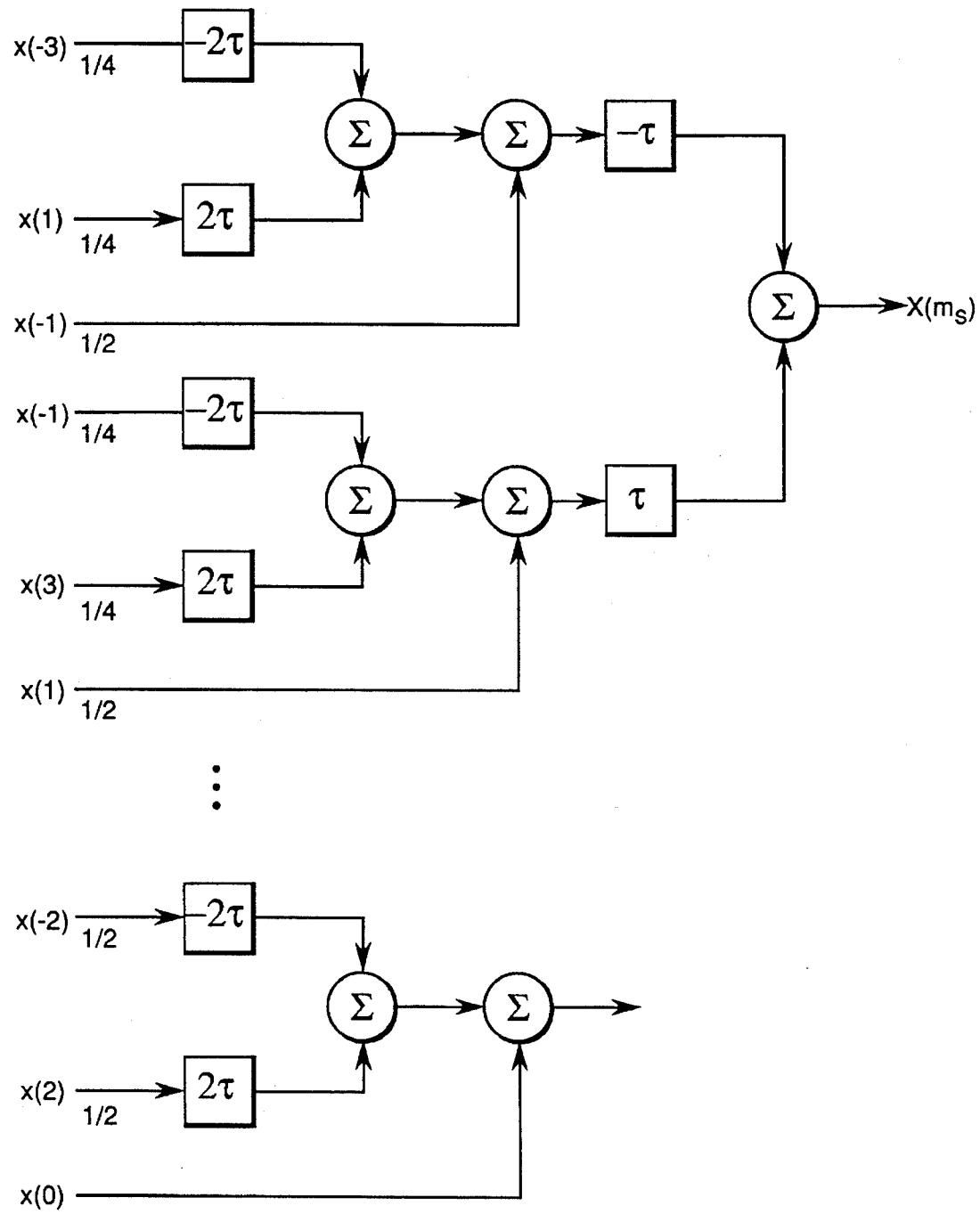
FIG. 12 is a block diagram of a seven-input balanced M=4 spatial filtering preprocessor which limits sensitivity of the beamformer to beam steering errors between the preprocessor and the channel delay processors in accordance with another preferred embodiment of the invention.

M=4 structures will produce spurious signals spaced from $k_s$ by steps of N/4. These may be substantially reduced by forming a fully balanced spatial filter structure such as shown in FIG. 12. This filter structure receives input signals from seven adjacent transducer elements to provide the fully balanced preprocessor function. By including three adjacent signals in addition to the four input signals of the group, a spatial filter is formed that is insensitive to steering angle offset error. This allows dynamic focusing delay changes to be made while still maintaining the delays of the preprocessor fixed.

In accordance with the preferred embodiment of FIG. 12, the weighting factor is unity for the output signal x(0) from the center element of the seven adjacent transducer elements. The output signals x(1) and x(−1) from the elements adjacent to the center element are each divided into three separate output signals using respective weighting factors of ½, ¼ and ¼. The last of the three separate output signals does not appear in FIG. 12 because it is supplied to the next adjacent preprocessor section (not shown). The output signals x(2) and x(−2) from the elements which are two elements away from the center element are each divided into two separate output signals using respective weighting factors of ½ and ½. Because the second of the two separate output signals is supplied to the next adjacent preprocessor section (not shown), it does not appear in FIG. 12. Finally, the output signals x(3) and x(−3) from the elements which are three elements away from the center element are each divided into three separate output signals using respective weighting factors of ½, ¼ and ¼. The last of the three separate output signals is supplied to the preprocessor section shown in FIG. 12, while the other two output signals are supplied to the next adjacent preprocessor section (not shown) and therefore do not appear in FIG. 12. The transform output signal $X(m_s)$ is a summation of these input signals with appropriate delays.

Each delay in the balanced filter structure of FIG. 12 is balanced by its negative. In a real system, however, it is not possible to implement a negative delay. This problem is solved in the usual way by providing a fixed delay and adding or subtracting from that value. The fixed delay is chosen to be large enough so that no result is negative.

In general, M−1 additional adjacent signals are added into each preprocessor section. These same signals are also used in their respective sections. This does not cause an increase in the number of total transducer sections except at the ends of the array. Both of the balanced filters for M=2 and for M=4 require additional input signals to satisfy the end effects of the filters. Because of this, the array length N is given by MQ+M−1, where Q is the number of channels required in the final delay processor. For M=2, one additional input signal is needed, while for M=4, three additional input signals are needed.

Figure 13:
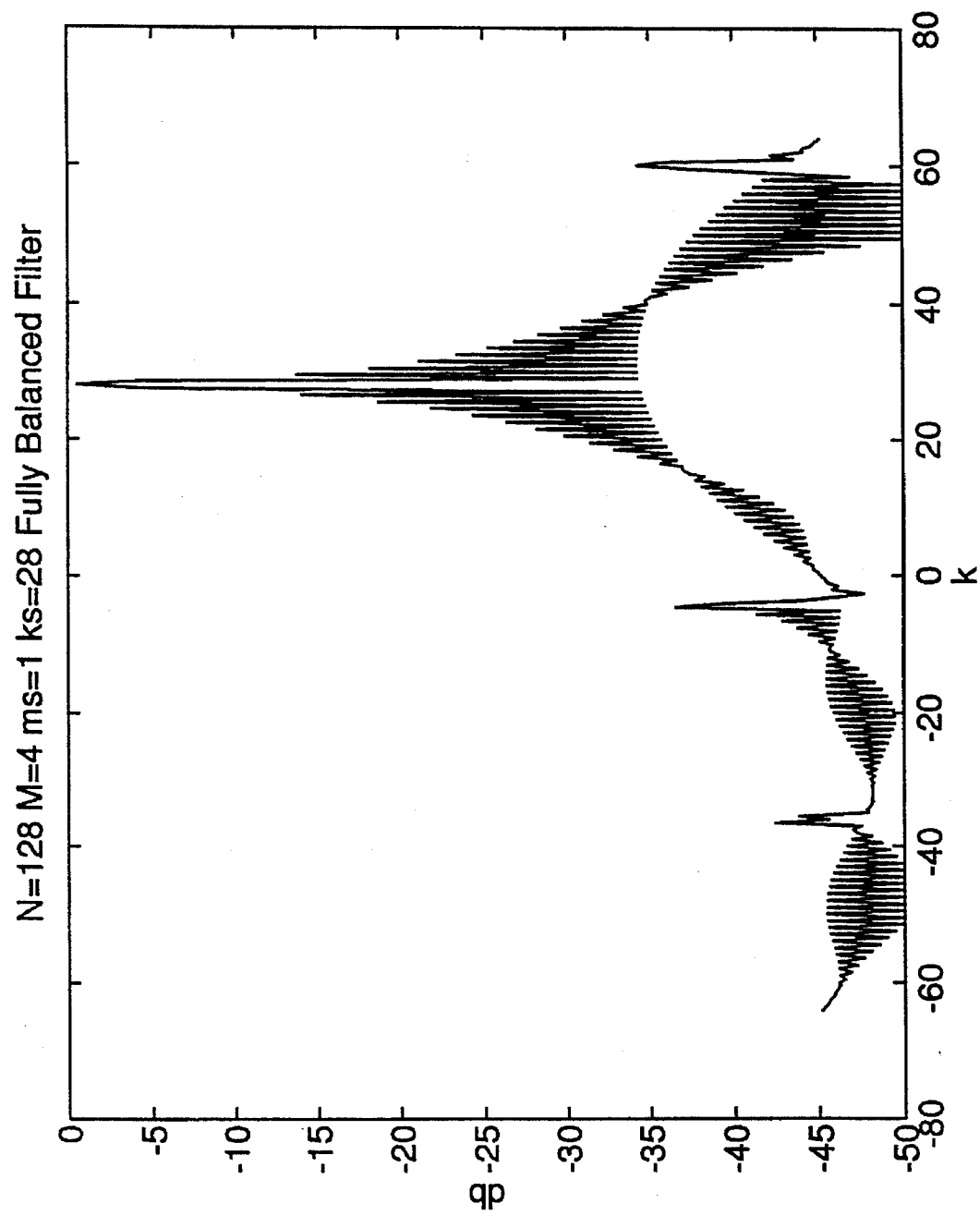
FIG. 13 is a graph showing the beam profile for a simulated system having the balanced M=4 preprocessor architecture of FIG. 12 when the beam steering error offset between the transform preprocessor and channel delay processor index equals 4.

FIG. 13 shows the beam profile produced by the balanced M=4 preprocessor of FIG. 12 when the beam steering offset error between the transform preprocessor and channel delay processor index equals 4. When FIG. 13 is compared to FIG. 5, which shows the beam profile for an unbalanced M=4 preprocessor with a beam steering offset error of 2, it can be seen that the spurious signals are suppressed.

Although the spatial filter of FIG. 12 provides a reduced level of spurious signals, further reductions are possible. These may be provided by additional spatial filtering. In accordance with the present invention it is possible to quantify these spurious signals under realistic conditions. The design of a nine-input spatial structure is presented in FIG. 14 and uses the input signals from nine adjacent transducer elements.

Figure 14:
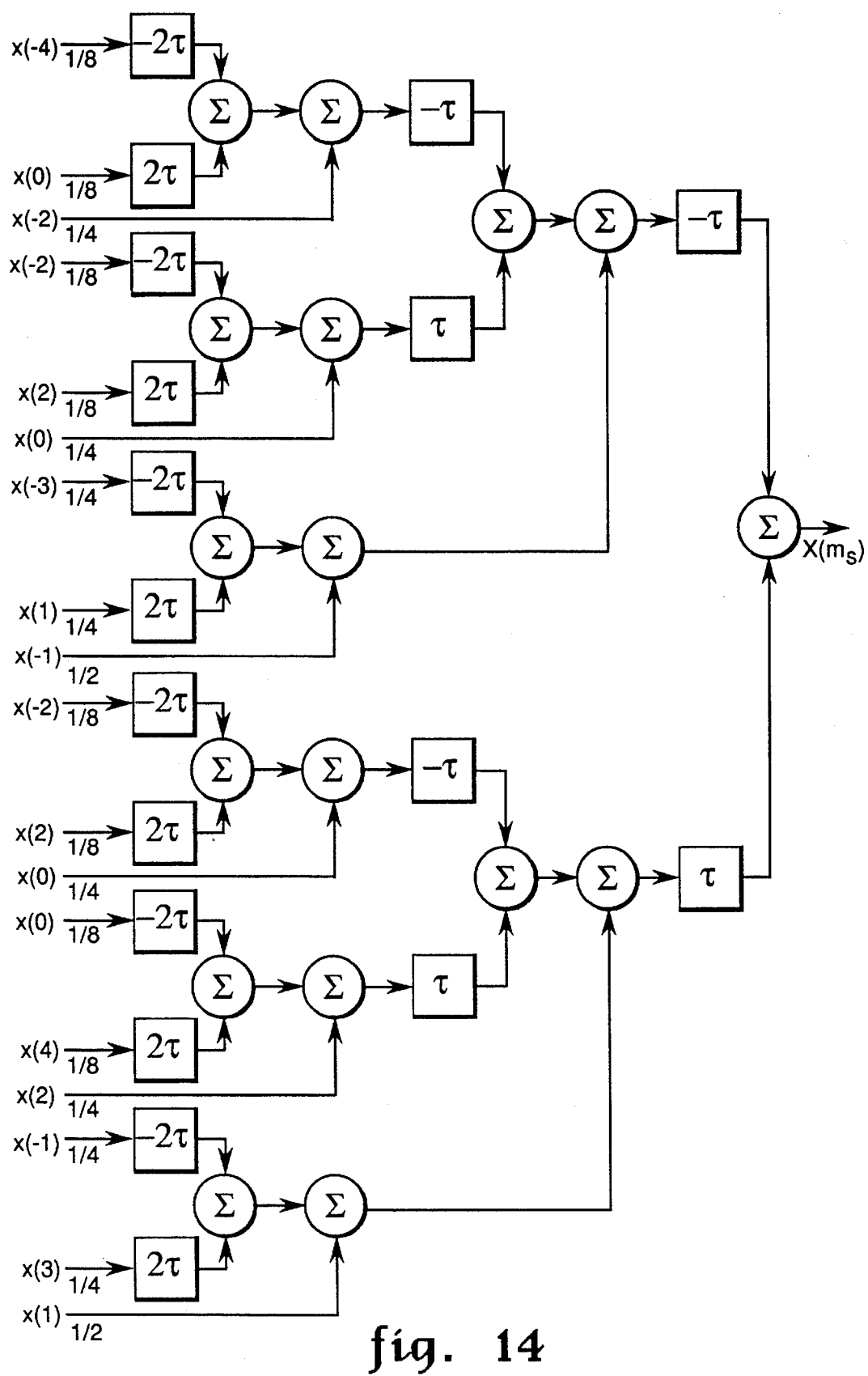
FIG. 14 is a block diagram of a nine-input balanced M=4 spatial filtering preprocessor in accordance with yet another preferred embodiment of the invention.

In accordance with the preferred embodiment of FIG. 14, the output signal x(0) of the center element of the nine adjacent transducer elements is divided into six separate output signals using respective weighting factors of ⅛, ⅛, ¼, ¼, ⅛ and ⅛. The first and last of the six separate output signals do not appear in FIG. 14 because the first output signal is supplied to the preceding adjacent preprocessor section (not shown) and the last output signal is supplied to the succeeding adjacent preprocessor section (not shown).

The output signals x(1) and x(−1) from the elements adjacent to the center element are divided into three separate output signals using respective weighting factors of ½, ¼ and ¼. The last of the three separate output signals x(−1) does not appear in FIG. 14 because it is provided to the preceding adjacent preprocessor section; the last of the three separate output signals x(1) does not appear in FIG. 14 because it is supplied to the succeeding adjacent preprocessor section.

The output signals x(2) and x(−2) from the elements which are two elements away from the center element are divided into six separate output signals using respective weighting factors of ⅛, ⅛, ¼, ⅛, ⅛ and ¼. The last three separate output signals x(−2) do not appear in FIG. 14 because they are supplied to the preceding adjacent preprocessor section; the last three separate output signals x(2) do not appear in FIG. 14 because they are provided to the succeeding adjacent preprocessor section.

The output signals x(3) and x(−3) from the elements adjacent to the center element are divided into three separate output signals using respective weighting factors of ½, ¼ and ¼. The first two of the three separate output signals for x(−3) do not appear in FIG. 14 because they are supplied to the preceding adjacent preprocessor section; the first two of the three separate output signals x(3) do not appear in FIG. 14 because they are provided to the succeeding adjacent preprocessor section.

Finally, the output signals x(4) and x(−4) from the elements which are four elements away from the center element are divided into six separate output signals using respective weighting factors of ⅛, ⅛, ¼, ¼, ⅛ and ⅛. The last five of the six separate output signals x(−4) do not appear in FIG. 14 because four output signals are supplied to the preceding adjacent preprocessor section and the last output signal is supplied to the next preceding preprocessor section (not shown); the last five of the six separate output signals x(4) do not appear in FIG. 14 because four output signals are supplied to the succeeding adjacent preprocessor section and the last output signal is supplied to the next succeeding preprocessor section (not shown).

The transform output signal $X(m_s)$ is a summation of all of the input signals to the spatial filtering preprocessor of FIG. 14 with appropriate delays. Because all of the weighting factors are in steps of a power of two, they may be implemented simply by a bit position shift of the data when the signals are in binary digital format.

Computer simulations have shown that it is advantageous to consider the beamforming function of a preprocessor as a narrow-band transform. If these structures are implemented as wideband delays, the resulting structure is also wideband. This follows from super-position and the observation that the analysis is true if the proper delay is provided at each input frequency. Wideband delays therefore result in a wideband system.

A wideband system similar to that of FIG. 2 may be designed. Such system will have the same analog electronic circuitry but only one fourth the digital electronic circuitry of a conventional digital baseband ultrasound imaging system, excluding the preprocessor itself. System performance, however, will be equal to that of the conventional system. A total cost savings of 25% will be realized for the total system. Further cost savings are possible if analog functions are further reduced, in which case the digital portion of the system will make up a larger fraction of the total cost. Other systems, such as economy systems with fewer elements, may be formed.

The design and implementation of the spatial filtering preprocessor in accordance with the present invention depends not only on the choice of filter but also on the choice of A/D converters. If a Δ-Σ modulator is used, the input information from each channel is presented to the preprocessor in the form of a single conductor carrying an offset binary code at a very high frequency of 160 MHz. All delays may therefore be implemented by selecting the multiplexed sample sequence. The spatial filter is followed by a two-stage decimation filter. This filter reduces the sample rate to 40 MHz in two steps.

Figure 15:
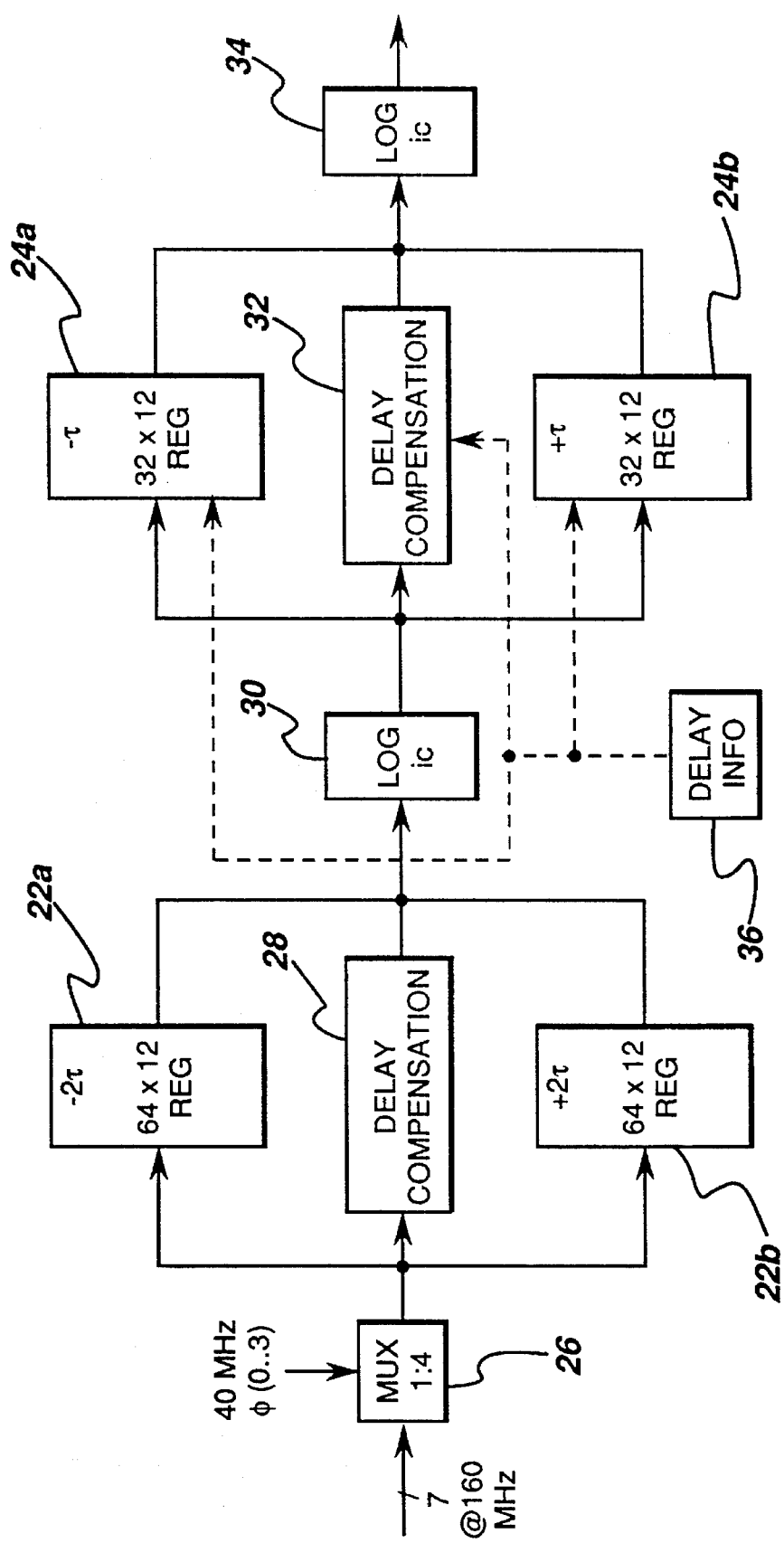
FIG. 15 is a block diagram of a seven-input balanced M=4 digital spatial filtering preprocessor suitable for use when Δ-Σ modulators are employed to convert signals from analog to digital form.

FIG. 15 shows the spatial filter delay section of a seven-input preprocessor filter to be used in conjunction with the Δ-Σ modulators. All seven signals required by the seven-input filter of FIG. 12 are supplied to a 1:4 multiplexer 26, which expands the width of each signal by 4 and reduces the data rate by the same factor. This enables memory structures to be operated at a reduced rate while still retaining all of the high data rate information. The signals are arranged into groups requiring like delays. These signals are delayed by +2τ, −2τ, or by only the compensating delay in accordance with the filter requirements in delay registers 22a, 22b or a compensating delay register 28, respectively. The magnitude of each delay is specified by a delay controller 36. The output signals of these delay registers are combined by logic circuitry 30, which also provides the fine delays specified by delay controller 36. Logic circuitry 30 generates three intermediate output signals which, in turn, are delayed in delay registers 24a, 24b and in a compensating delay register 32. These delays are also specified by delay controller 36. Logic circuitry 34 combines the output signals of delay registers 24a, 24b and 32, and provides a final fine delay in increments of periods of a 160 MHz clock (not shown), also under the control of delay controller 36. Thus logic circuitry 34 produces the final output signal $X(m_s)$ of the preprocessor filter. Operation of an expanded nine-input preprocessor would be similar.

Figure 16:
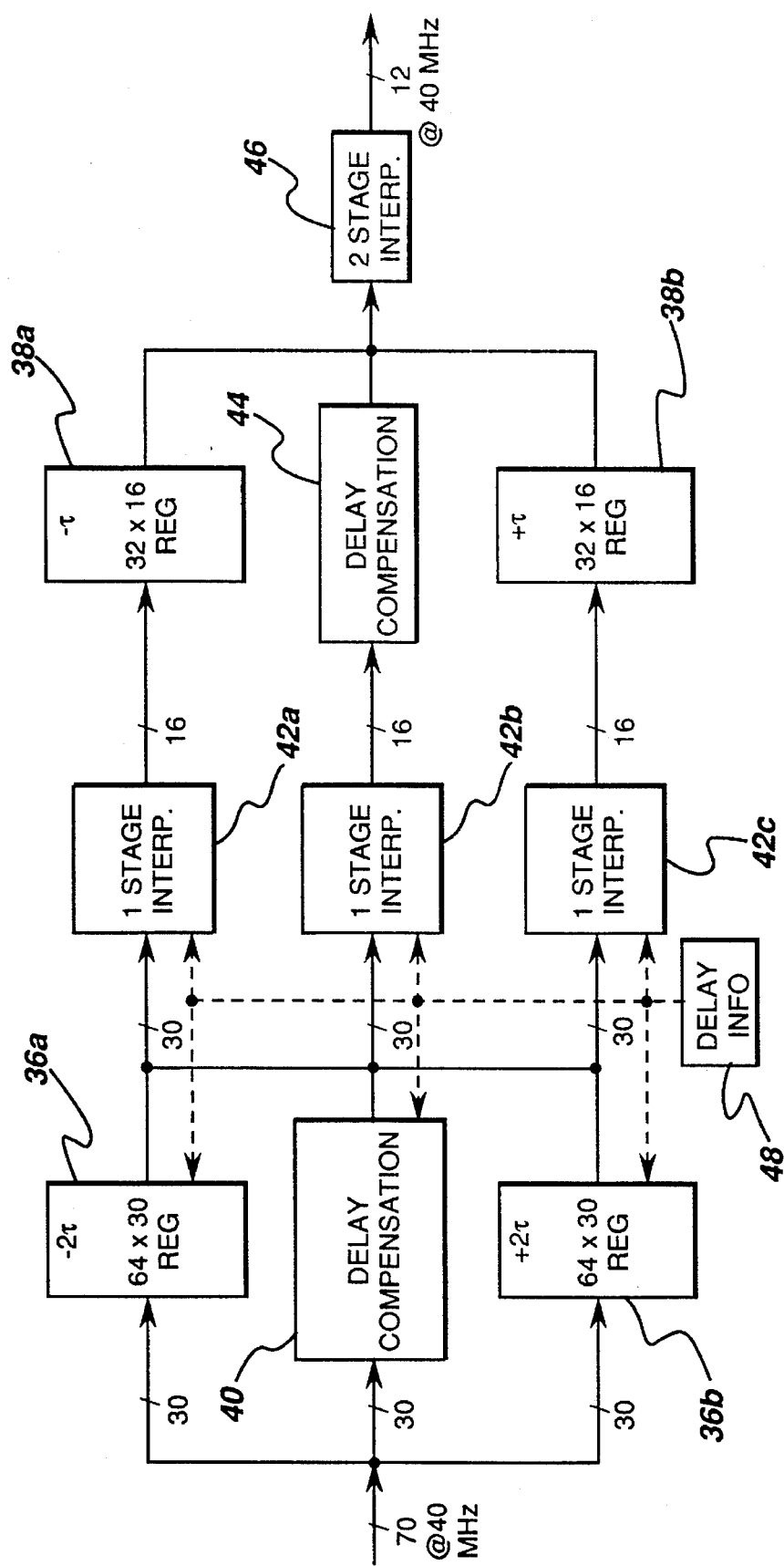
FIG. 16 is a block diagram of a seven-input balanced M=4 digital spatial filtering preprocessor suitable for use when conventional A/D converters are used.

If standard A/D converters are used, the number of input signals is increased by the width of each word, but the frequency is reduced to 40 MHz. This eliminates the need for multiplexing and decimation filtering, but introduces the need to interpolate. Delays in steps of a 160 MHz clock (not shown) require two stages of interpolation filtering. In designing preprocessors of this type, time delays at the 40 MHz rate are provided by delay register banks 36a, 36b, 38a and 38b shown in FIG. 16. A total of four delay register banks are required: two (36a, 36b) are 64 stages long and two (38a, 38b) are 32 stages long. These may be implemented as dual-port FIFO (first-in first-out) structures of 2 kbytes and 1 kbyte each. Fine control of the longer delay register banks is provided by three one-stage interpolation filters 42a–42c. Only one stage is needed since the 2τ delay requires only steps of the period of an 80 MHz clock (not shown). Delay registers 36a and 36b are each 30 bits wide to accommodate three 10-bit-wide signals. A compensating delay register 40 is also 30 bits wide to accommodate the three signals that do not require delays other than those required to compensate for the fixed delay of delay register banks 36a and 36b. The three interpolation filters 42a–42c expand the width of the data word to 16 bits, but reduce the number of signals by a factor of three. A delay controller 48 stores the required information for the beam direction and specifies the delays of registers 36a and 36b and interpolation filters 42a–42c. The second-stage delay therefore needs to be only 16 bits wide. It is also only one half the length of the first-stage delay and hence needs to be only 32 stages long. The second stage of the delay requires a two-stage interpolation filter 46 to provide the delay steps of the period of the 160 MHz clock. At the output of the preprocessor chip the word width is reduced to 12 bits. This is sufficient to accommodate the information from the four channels.

An expanded nine-input spatial filter may be formed by an almost identical structure. Two additional delay registers must be used. These, however, do not require any additional interpolation, as they are 4τ delays.

Figure 17:
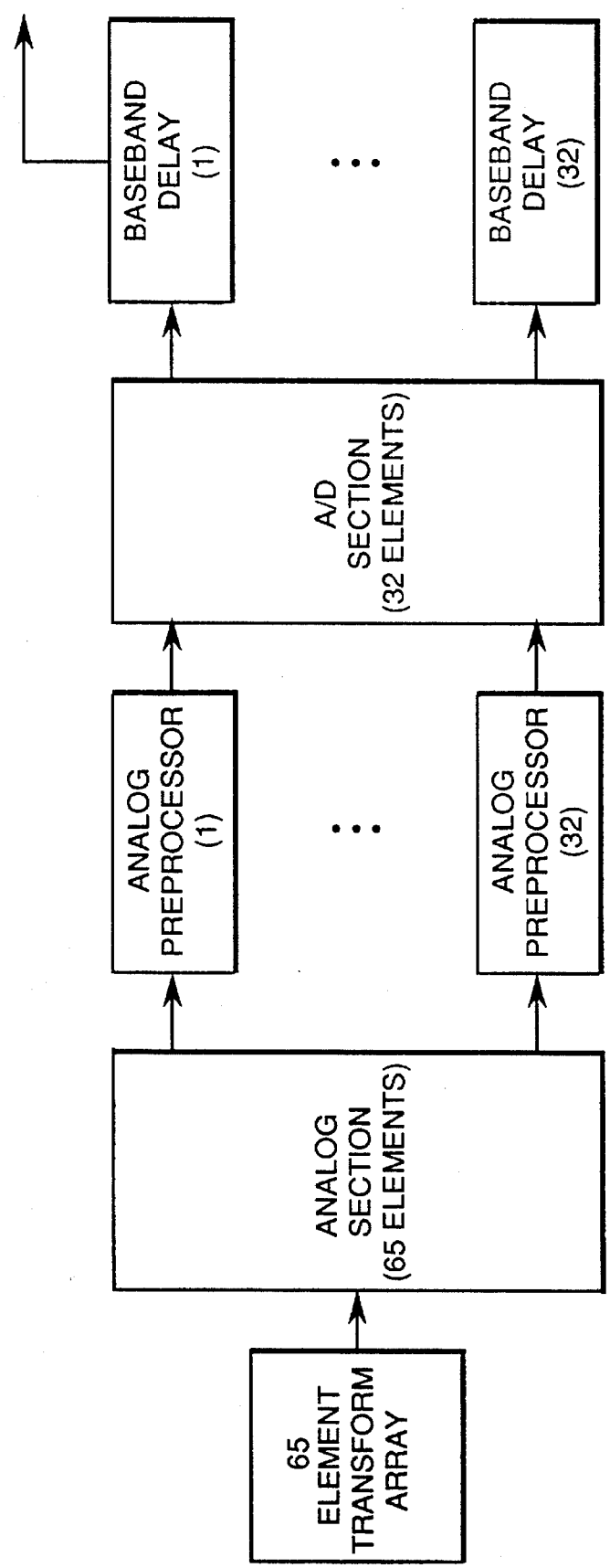
FIG. 17 is a block diagram of a transform beamforming system having a 65-element transducer array and 32 delay channels.

An economy beamforming system may be fabricated with reduced channel count as compared to conventional ultrasound imaging systems. FIG. 17 illustrates, as an example, an economy beamforming system having a 65-element transducer and a 32-channel delay processor, with an analog implementation of the preprocessor. In this system, M=2. This requires 32 analog preprocessor delay stages and results in a saving of half of the A/D converter and its associated filter requirements and half of the digital beamforming section. The beamformer of such system is roughly one third the size of the conventional imaging system.

An alternative (not shown) to the architecture of FIG. 17 interchanges the positions of the A/D and analog preprocessor sections. In this embodiment the number of A/D converters is increased to 35, but the number of preprocessors remains the same. This configuration allows the preprocessor to be implemented digitally.

Figure 18:
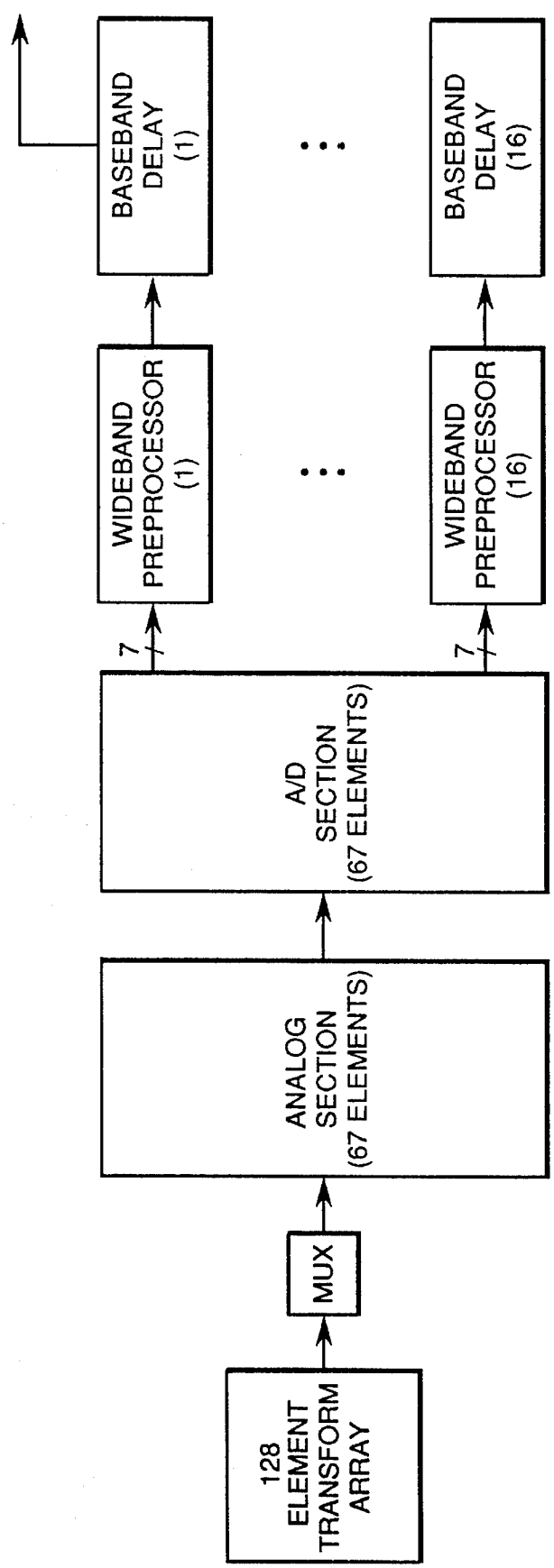
FIG. 18 is a block diagram of a transform beamforming system having a 128-element transducer array and 67 delay channels.

An alternative economy system having a 128-element transducer and a 16-channel delay processor is shown in FIG. 18. Repeat firings of 64 transducer channels at a time can provide quality beamforming similar to that achieved by the full 128 channels of a conventional system. The number of receive channels used on each firing is expanded from 64 to 67 to take care of the end effect channels of the preprocessor architecture with M=4 and the seven-input spatial filter. The 67 transducer elements are selected by the multiplexer from the full-width array of 128 elements. These are processed by the 67 analog channels leading up to the A/D converters. The output signals of these converters are provided to 16 digital preprocessor balanced spatial filter circuits of the type described above. The output signals of these circuits are supplied to 16 time delays to complete the beamforming. The transmit output signals of the 16 preprocessor circuits also provide the necessary transmit timing signals for the transducer firing sequence. A system of this type implemented by integrated circuit chips can be accommodated on a total of four beamforming circuit boards.

In accordance with the present invention, therefore, a two-stage ultrasonic imaging beamformer can be built with significant savings in hardware compared to the usual single-stage beamformer. The first stage combines signals from four channels into a single output signals that is processed by a delay chip of conventional design. If these channel output signals are simply combined, any error in the array delays will cause formation of spurious beams. By employing a spatial filter that combines signals from the four selected channels along with adjacent channels, this problem is greatly reduced. Consequently, systems can be built to include a fixed delay in the first or preprocessor stage during the computation of each beam. All dynamic processing is performed in the second or final delay stage.

The hardware savings associated with the two-stage system of the invention may be combined with other methods for simplifying and reducing the system. It may, for example, be combined with the use of Δ-Σ modulators. In such system the fixed nature of the preprocessor allows a reduction in the number of decimation filters. A system that uses conventional A/D converters but combines the two-stage system architecture with 1:2 and 2:1 processing has been disclosed. These hardware savings can form the basis for an economy beamforming system having performance comparable to conventional 128-channel systems but with one third the hardware.

Transmission beamforming is as important as receiver beamforming. The preprocessor section therefore must also provide this function. The preferred approach in either of the above systems is a digital register delay of the transmission pattern, followed by edge resampling. The transmit memory provides the basic pattern storage and one of the four phases of the 40 MHz clock provides the sampling edge to 6 nsec. The one-bit-wide data are delayed by register delays and then resampled by one of the phases. The four output signals are then sent to conventional transducer transmit/receive circuits.

In addition to the economy systems described above, the preprocessor in accordance with the present invention may also be used to advantage in 1.5-dimensional and two-dimensional systems.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An ultrasound imaging system comprising:

an array of ultrasound transducer elements;

a multiplicity of delay channels being fewer in number than the transducer elements of said array; and preprocessor means for transforming output signals from said array of transducer elements into input signals for said multiplicity of delay channels, wherein an input signal to a first delay channel is partly a function of the output signal from a first transducer element multiplied by a first weighting factor and an input signal to a second delay channel is partly a function of said output signal from said first transducer element multiplied by a second weighting factor.

2. The ultrasound imaging system as defined in claim 1, wherein said preprocessor means includes multiplexer means coupled to said multiplicity of delay channels and wherein the output signal from said first transducer element is divided into a predetermined number of individually weighted input signals for said plurality of delay channels, the sum of said weighting factors being equal to unity.

3. The ultrasound imaging system as defined in claim 1, wherein second and third ones of said transducer elements are situated adjacent to said first transducer element in said array, each of the input signals to said first and second delay channels further being partly a function of the output signals from said second and third ones of said transducer elements.

4. The ultrasound imaging system as defined in claim 1, wherein said preprocessor means comprises a plurality of preprocessor sections, each respective one of said preprocessor sections comprising a plurality of delay means for producing a controllable amount of delay, and a plurality of summation means.

5. The ultrasound imaging system as defined in claim 1, wherein said preprocessor means comprises a plurality of preprocessor sections, each respective one of said preprocessor sections being adapted to receive input signals from a first predetermined number of transducer elements of said array and further being adapted to provide a second predetermined number of output signals to a number of delay channels corresponding to said second predetermined number, said first predetermined number being greater than said second predetermined number.

6. The ultrasound imaging system as defined in claim 5, wherein said second predetermined number equals unity.

7. The ultrasound imaging system as defined in claim 6, wherein said first predetermined number equals three.

8. The ultrasound imaging system as defined in claim 7, wherein a first one of said preprocessor sections has first, second and third inputs for receiving output signals, multiplied by respective weighting factors, from said first transducer element, second and third transducer elements adjacent to said first transducer element, fourth and fifth transducer elements adjacent to said second and third transducer elements, respectively, and wherein a second preprocessor section has first, second and third inputs for receiving output signals, multiplied by respective weighting factors, from said first, second and fourth transducer elements.

9. The ultrasound imaging system as defined in claim 6, wherein said first predetermined number equals seven.

10. The ultrasound imaging system as defined in claim 9, wherein a first one of said preprocessor sections has first through seventh inputs for receiving output signals, multiplied by respective weighting factors, from said first transducer element and from additional second through seventh transducer elements of said array, and a second preprocessor section has first through seventh inputs for receiving the output signals, multiplied by respective weighting factors, from said first through third transducer elements and from additional eighth through eleventh transducer elements of said array.

11. The ultrasound imaging system as defined in claim 6, wherein said first predetermined number equals nine.

12. The ultrasound imaging system as defined in claim 11, wherein a first one of said preprocessor sections has first through ninth inputs for receiving output signals, multiplied by respective weighting factors, from said first transducer element and from additional second through ninth transducer elements of said array, and a second preprocessor section has first through ninth inputs for receiving the output signals, multiplied by respective weighting factors, from said first through fifth transducer elements and from additional tenth through thirteenth transducer elements of said array, and a third preprocessor section has first through ninth inputs for receiving the output signals, multiplied by respective weighting factors, from said fifth through ninth transducer elements and from additional fourteenth through seventeenth transducer elements of said array.

13. An ultrasound imaging system comprising:

an array of ultrasound transducer elements;

analog signal processing means for processing analog signals from said transducer elements;

analog-to-digital conversion means for converting analog signals to digital signals;

a multiplicity of delay channels coupled to receive digital signals from said analog-to-digital conversion means and being fewer in number than the transducer elements of said array; and preprocessor means coupled between said analog signal processing means and said analog-to-digital conversion means for transforming output signals from said analog signal processing means into input signals for said analog-to-digital conversion means, wherein an input signal to a first one of said delay channels is partly a function of an output signal from a first transducer element multiplied by a first weighting factor and an input signal to a second one of said delay channels is partly a function of said output signal from said first transducer element multiplied by a second weighting factor.

14. The ultrasound imaging system as defined in claim 13, wherein said preprocessor means comprises a plurality of preprocessor sections, each of said preprocessor sections being adapted to receive input signals derived from the outputs of a first predetermined number of said transducer elements and to provide a second predetermined number of output signals to a corresponding number of said multiplicity of delay channels through said analog-to-digital conversion means, said first predetermined number being greater than said second predetermined number.

15. The ultrasound imaging system as defined in claim 14, wherein said second predetermined number equals unity.

16. An ultrasound imaging system comprising:

an array of ultrasound transducer elements;

analog signal processing means for processing analog signals from said transducer elements;

analog-to-digital conversion means for converting analog signals received from said analog signal processing means to digital signals;

a multiplicity of delay channels, said delay channels being fewer in number than the transducer elements of said array; and preprocessor means for transforming output signals from said analog-to-digital conversion means into input signals for said delay channels, wherein an input signal to a first delay channel is partly a function of the output signal from a first one of said transducer elements multiplied by a first weighting factor and an input signal to a second delay channel is partly a function of said output signal from said first one of said transducer elements multiplied by a second weighting factor.

17. The ultrasound imaging system as defined in claim 16, wherein said preprocessor means comprises a plurality of preprocessor sections, each of said preprocessor sections being adapted to receive input signals from a first predetermined number of said transducer elements through said analog-to-digital conversion means and to provide a second predetermined number of output signals to a corresponding number of said multiplicity of delay channels, said first predetermined number being greater than said second predetermined number.

18. The ultrasound imaging system as defined in claim 16, wherein said analog-to-digital conversion means comprises a plurality of $\Delta$-$\Sigma$ modulators.

19. The ultrasound imaging system as defined in claim 16, further comprising multiplexing means coupled between said array of transducer elements and said analog signal processing means.

* * * * *